United States Patent Office 3,819,816
Patented June 25, 1974

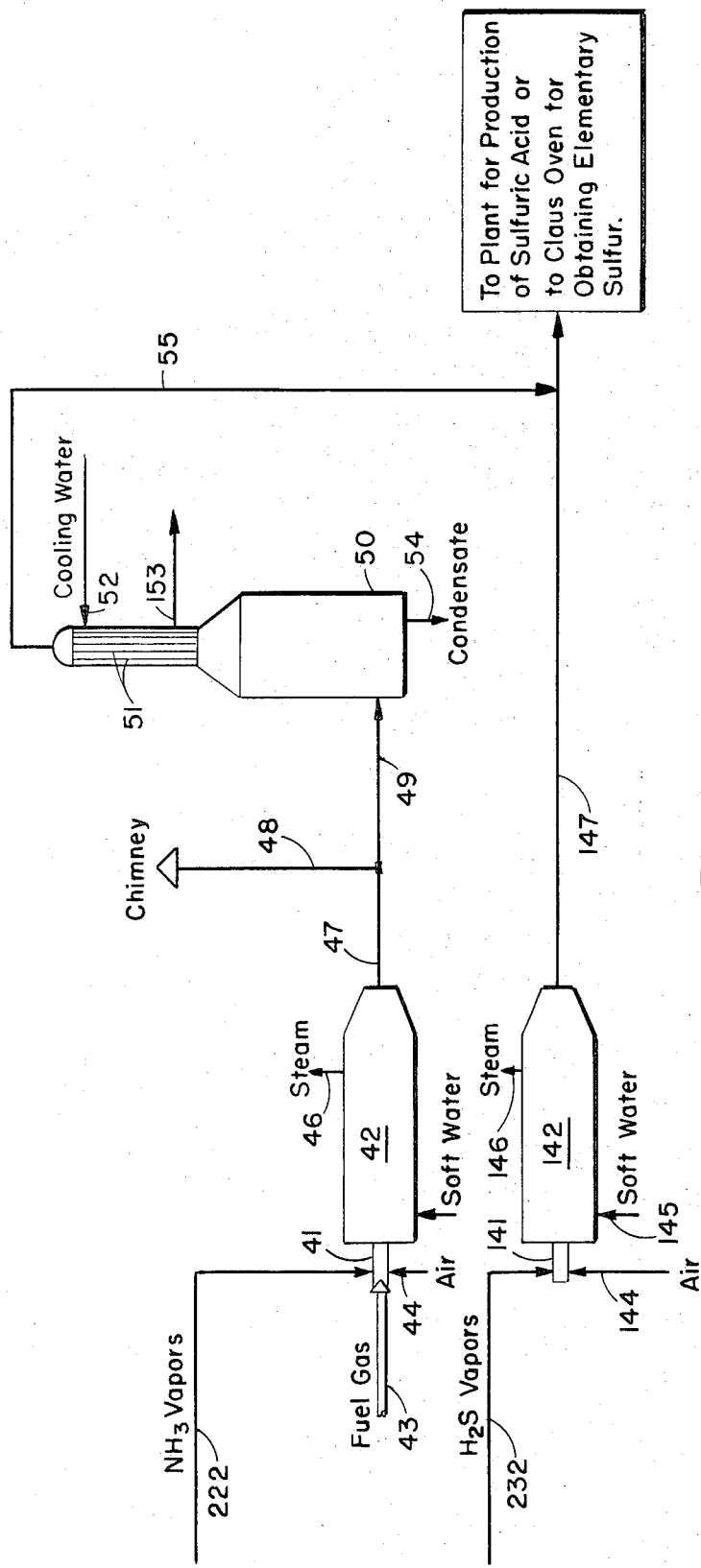

3,819,816
PROCESS FOR THE MANUFACTURE OF SULFUR OR SULFURIC ACID FROM COKE OVEN GAS
Günter Wunderlich, Sterkrader Str. 37, Bottrop, Germany, and Heinrich Weber, Lenaustr. 2, Recklinghausen, Germany
Continuation-in-part of abandoned application Ser. No. 38,255, May 18, 1970. This application Apr. 20, 1972, Ser. No. 246,041
Claims priority, application Germany, May 21, 1969, P 19 25 839.0, P 19 25 840.3
Int. Cl. C01b 17/02, 17/16, 17/72
U.S. Cl. 423—522      5 Claims

ABSTRACT OF THE DISCLOSURE

A process is described for the complete elimination of ammonia and hydrogen sulfide from coke oven gases, in which the gases are scrubbed with water and the aqueous $NH_3$-solution is recycled and the laden water and aqueous $NH_3$-solution is desorbed with steam or with either combustible or non-combustible gases in a deacidification process, thereafter enriching $NH_3$ and $H_2S$ in the desorption gases or damp vapors, and scrubbing the gases with water and recycling; the damp vapors are burned with sufficient air for converting ammonia to nitrogen and water, and obtaining elementary sulfur or sulfuric acid from the hydrogen sulfide. In this process, the damp vapors recovered from the deacidification are divided into two fractions, one containing ammonia essentially free from hydrogen sulfide and the other containing hydrogen sulfide essentially free from ammonia, and the two fractions are burned separately, after which the condensate is separated from the gaseous combustion product streams and the two streams combined, whereby the temperature and/or concentration of the gases is adjusted before being processed further.

CROSS-REFERENCE TO CO-PENDING APPLICATION

This application is a continuation-in-part of our co-pending Application Ser. No. 38,255, filed on May 18, 1970, now abandoned.

BACKGROUND OF THE INVENTION AND PRIOR ART

The invention relates to the complete elimination of ammonia contained in coke oven gases with simultaneous burning of $H_2S$.

In a known process carried out for that purpose, coke oven gases are scrubbed with water and aqueous $NH_3$-solution and desorption vapors containing $NH_3$ and $H_2S$ are rinsed free of the acid and enriched in ammonia in the known ammonia recycling process, whereafter the entire free ammonia is converted by combustion with sufficient air to yield hydrogen and water while $H_2S$ is burned to yield sulfur. The combustion heat of ammonia is recovered in the form of high-pressure steam. The entire process is usually carried out in a single combustion device. Instead of recovering sulfur in elementary form, it has also been proposed to produce sulfuric acid in high concentration.

According to another known process, ammonia water withdrawn at any convenient stage during the indirect ammonia recovery process, said water being free of $H_2S$, is subjected to a desorption process with ammonia-free under-firing gas or with steam; the ammonia-laden vapors are then burned in the heating flues of coke ovens.

Another known process uses ammonia water taken from any desired point in the indirect ammonia recovery process, the water being substantially free of $H_2S$, and subjects the ammonia water to a desorption process with any known combustible gas, with the exception of under-firing gas, or with air whereafter the ammonia-laden gases or the air serves as a combustion medium for the air heaters of blast furnaces, blast furnaces proper, steel mill and foundry ovens, or as components for producing gas in gas generators or gas generating plants.

As discussed herein, it is known to wash the hydrogen sulfide out of coke oven gases with alkaline or ammoniacal, usually aqueous washing agents, to expel therefrom the absorbed hydrogen sulfide with combustible or noncombustible gases, air or water vapor, to regenerate the washing agent in the process and to return it into the washing process again.

It is also known to wash the ammonia out of the coke oven gas with water and to combine the two ammonia and hydrogen sulfide washing processes into one circulating process, the so-called ammonia/hydrogen sulfide circulating washing process. This combination washing process can be so conducted as to either obtain the hydrogen sulfide and the ammonia separately, or both substances are obtained combined in a mixture. The principles of these methods are described by Döring in "Gluckauf," vol. 97 (1961) on pages 1211 to 1217. Therein, ammonia and hydrogen sulfide are obtained in the form of vapors. The vapors in which only the ammonia is concentrated contain only little hydrogen sulfide and, vice versa, the vapors in which the hydrogen sulfide is concentrated contain only little or practically no ammonia.

Also known are methods in which the entire ammonia washed out of the coke oven gas is concentrated in the so-called deacidifier vapors of the ammonia/hydrogen sulfide circulating washing system, the deacidifier vapors are combusted in their entirety, the combustion heat is utilized in the form of high pressure steam, condensate is drained and sulfur or sulfuric acid is obtained from the combustion gases. In these methods, the addition of combustion air depends on whether sulfur or sulfuric acid is to be obtained. Fuel gases may be added to the vapors to further the combustion.

Also known are methods in which the ammonia water, resulting at random places in the indirect ammonia-producing method and being largely free of hydrogen sulfide is subjected to a desorption process with undergrate fire gases free of ammonia and/or steam, any other combustible gases or also air, the ammonia-laden gases or clouds being subsequently burned in the flues of the coking ovens, or the ammonia-laden gases or the air being used as combustion media in the blast heaters of blast furnaces, in the blast furnaces themselves, in steel mill or smelting furnaces or as components for gas production in gas generators or gas production facilities.

In applying these methods, the hydrogen sulfide is removed from the coke oven gas by any known method to be utilized or reconditioned.

Another utilization or application of the combustion gases of the ammonia is not provided for in any of these methods.

In combusting the streams of hydrogen sulfide or ammonia gases and also the vapors containing hydrogen sulfide and ammonia, the combustion gases discharging from the combustion furnaces have temperatures far above those at which they can be processed into sulfur or sulfuric acid, in other words, at which they can enter a Claus or wet catalysis installation.

The temperatures of the combustion gases amount to approximately 900 to 1300° C., whereas processing takes place at about 200 to 500° C. Therefore, the combustion gases must be cooled, and cooling is accomplished mostly in waste heat boilers in which steam is generated and, to a lesser extent, in coolers without the utilization of heat.

For their further processing, the combustion gases contain an unfavorably high share of water vapor. This percentage of water vapor is reduced by separating it from a part of the combustion gases.

The result of cooling the combustion gases to below 100° C., at normal pressure, is an aqueous condensate. During the combustion of vapors containing hydrogen sulfide, which is also during the combustion of vapors containing ammonia in addition, an aqueous condensate results which, depending upon temperature and equilibrium conditions, contains greater or smaller amounts of suspended, colloidal elementary sulfur and/or dissolved sulfur dioxide.

As waste water, such condensates are extremely troublesome because they must be treated and neutralized before they can be released into the public waste water network. One, therefore, endeavors to diminish or completely avoid the occurrence of such condensates. However, such methods have not become known heretofore. The invention relates to such a method.

SUMMARY AND DESCRIPTION OF THE INVENTION

A new method for the manufacture of sulfur or sulfuric acid from the hydrogen sulfide of coke oven gases due to the partial or complete combustion of the hydrogen sulfide to sulfur dioxide and processing of the combustion gases to sulfur by the Claus method and to sulfuric acid by the wet catalysis method, under simultaneous combustion of the coke oven gas ammonia, is described. The ammonia and the hydrogen sulfide are washed out of the coke oven gas by means of an ammonia/hydrogen sulfide circulating washing process and the ammonia is concentrated in the so-called deacidifier vapors. The method is characterized in that the deacidifier vapors are separated into an ammonia fraction and a hydrogen sulfide fraction; the ammonia fraction and the hydrogen sulfide fraction are burned; the resulting combustion gases are cooled; aqueous condensate is drained from the ammonia combustion gases and the ammonia and hydrogen sulfide combustion gases are subsequently combined and the combined combustion gases are processed.

The separation of the deacidifier vapors containing all the ammonia into hydrogen sulfide vapors largely free of ammonia and into ammonia vapors largely free of hydrogen sulfide is carried out, for example, in the upper part of the deacidifier column itself and the latter is appropriately equipped for this purpose. If a bubble cap column with approximately 12 trays is used, for instance, it is enough to provide the column with 4 to 6 additional trays and otherwise to charge the column as customary in the industry and also to maintain the usual reflux conditions. The hydrogen sulfde vapors are then taken from its head and the ammonia vapors from a lower point. The aforesaid separation can also take place in a separate separating column, succeeding the deacidifier column and having 12 to 15 bubble cap trays, the hydrogen sulfide vapors being taken from its head and the ammonia vapors from a lower point.

This new method, according to the invention, offers the great advantage that only the ammonia combustion gases containing but little sulfur dioxide are cooled down much (such as to 40° C.), without the occurrence of sulfur dioxide-containing condensates which require special treatment and which would, in addition, reduce the sulfur or sulfuric acid yield.

At the most, the hydrogen sulfide combustion gases are cooled far enough (such as to 130° C.) that elementary sulfur condenses out of them, to be removed in liquid state from the cooler bottom. Aqueous condensate does not result therefrom.

Under circumstances, the aqueous condensate of the ammonia combustion can also be taken into the coolant circulation to replace losses there.

By combining and mixing the cooled ammonia combustion gas freed of water with the cooled hydrogen sulfide combustion gas, the temperature of the combined combustion gas flow is then reached which is required for the further processing to sulfur or sulfuric acid.

Another form in which the method can be carried out is that the hydrogen sulfide is washed out of the coke oven gas by any known method with ammonia water or other aqueous solutions such as potash solutions, to be driven unchanged out of the wash solutions, whereas ammonia is washed out with water and driven out therefrom again, whereupon the hydrogen sulfide gases or vapors and the ammonia vapors are burned separately, the combustion heat is utilized, the combustion gases are cooled, aqueous condensate is separated from the ammonia combustion gas and the combustion gases are combined for processing to sulfur or sulfuric acid.

However, these methods are uneconomical in comparison with the method according to the invention, which distinguishes itself by its especially low energy consumption, in particular, steam consumption. The case may occur in oil refineries, however, that gases containing much hydrogen sulfide must be purified besides ammonia and gases containing little hydrogen sulfide, and that hydrogen sulfide and ammonia must be processed. In that case, it is evident for reasons of environment protection alone, to combine, after draining aqueous condensate, the ammonia combustion gases with the hydrogen sulfide combustion gases so as not to discharge the amounts of sulfur dioxide, even though small, contained in the ammonia combustion gases into the atmosphere, but to utilize them for the production of sulfur or sulfuric acid.

By bringing the differently cooled combustion gas flows of ammonia and hydrogen sulfide together, the combined gas flow then just about reaches the temperature which the gas flow for further processing to sulfur or sulfuric acid must have.

The present invention relates to a further development of the above-mentioned process for the elimination of ammonia and hydrogen sulfide from coke oven and other gases and vapors comprising scrubbing the gases with water and recycling aqueous $NH_3$-solution, desorbing the laden water and aqueous $NH_3$-solution with steam or combustible or non-combustible gases in a deacidification process and enriching $NH_3$ and $H_2S$ in the desorption gases or damp vapors, and by burning the damp vapors with sufficient air for decomposing ammonia to nitrogen and water, and obtaining elementary sulfur or sulfuric acid from $H_2S$. It has been found that improved results of the order of 95% or better may be obtained if the damp vapors recovered after the deacidification, are divided into two fractions; one containing ammonia essentially free from hydrogen sulfide, the other containing hydrogen sulfide essentially free from ammonia, and then the two fractions are burned separately.

Although it is true that contrary to the known processes, at least two combustion devices have to be installed for the process of the invention, the latter has the advantage that in the course of working up the $H_2S$, less condensate has to be withdrawn and, since the condensate may contain $SO_2$, a loss of that source of sulfur is avoided.

The final separation of $NH_3$- and $H_2S$-vapors is carried out in a separating column arranged in series after the scrubber used in the cycle process for scrubbing the ammonia-hydrogen sulfide-containing gases and vapors. In another embodiment, the final separating column can be provided in the upper part of the $NH_3$-desorbing column proper, e.g. by adding a few trays at the top of the column and operating it with adequate amounts of reflux. To both the ammonia- and the hydrogen sulfide desorption vapors, ignition- or fuel gases may be added for promoting the combustion. The gases from the ammonia combustion may be allowed to escape through the stack into the open after having been cooled in a waste heat vessel.

However, after condensate has been withdrawn therefrom, they may be combined with the burnt vapors of hydrogen sulfide, if desired, for the purpose of adjusting the temperature and concentration of $SO_2$ before this is subjected to catalytic wet oxidation.

The process, according to the invention, will now be described with reference to the accompanying drawings.

BRIEF DESCRIPTION OF THE DRAWINGS

In the drawings:

FIG. 3 is a schematic illustration of a device for the separate combustion of $NH_3$ and $H_2S$ vapors.

Referring now to FIG. 1, a pipe line 1 is shown for admission of crude coke oven gas to a $H_2S$-scrubber 2. In the scrubber, coke oven gas is freed of $H_2S$ by recycled ammonia water admitted through pipe line 3 and another portion of ammonia water introduced by line 4. The scrubbed coke oven gas leaves the $H_2S$-scrubber through pipe line 5 which leads into the $NH_3$-scrubber, from where the gas leaves after scrubbing through line 8 and from there it is passed to further processing stages. A pipe line 7 is provided for admitting softened fresh water to the scrubber 6.

Figure 1:
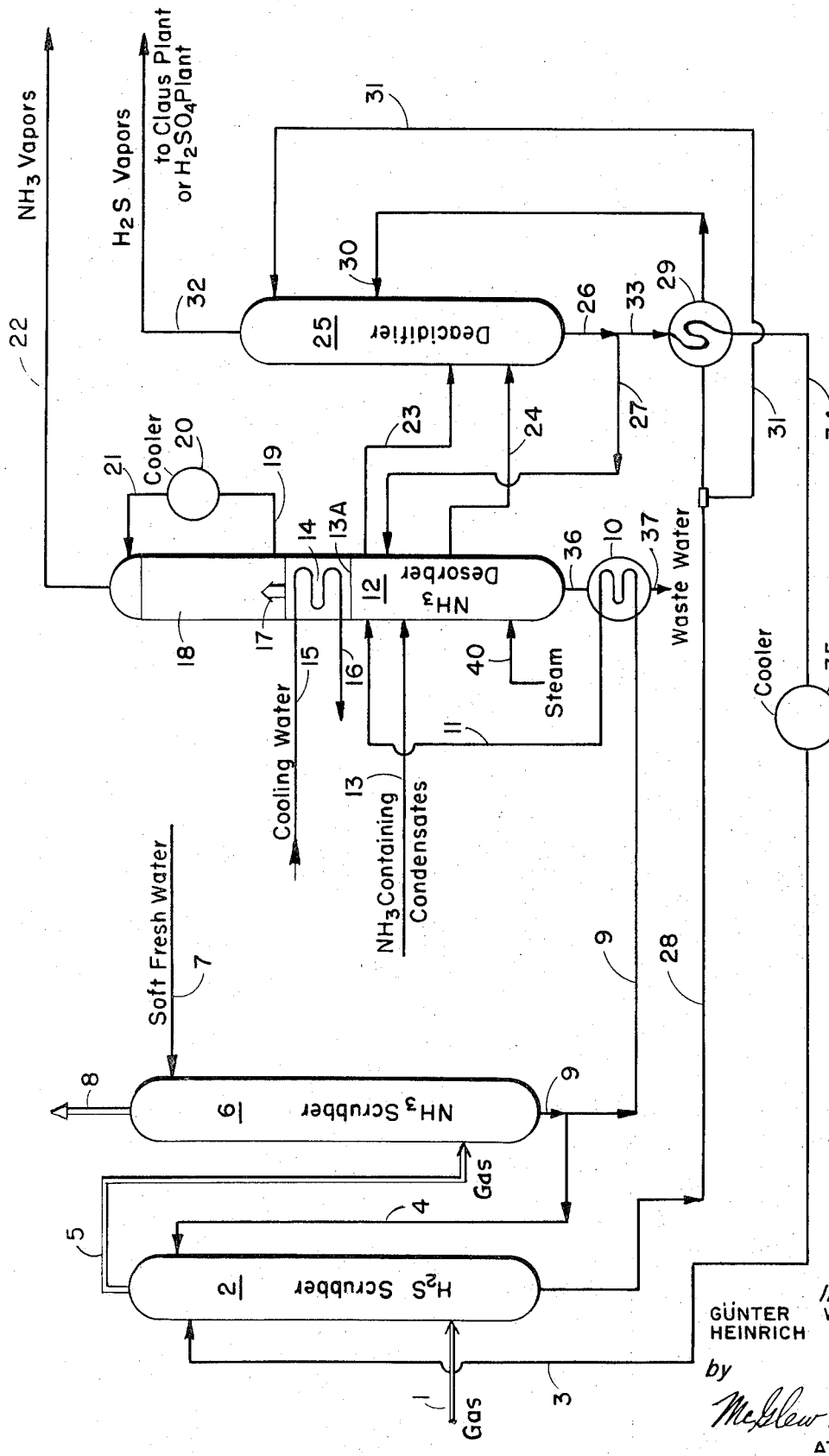
FIG. 1 is a schematic illustration of an apparatus for the scrubbing of ammonia and hydrogen sulfide from coke oven gas in a cycle process, in which a separating column for the final separation of hydrogen sulfide from the $NH_3$ vapors is provided on top of the $NH_3$ desorbing column.

$NH_3$-containing washing water is carried off at the bottom of scrubber 6 through line 9 and part of it is passed through line 4 to the $H_2S$-scrubber 2, while another part is conveyed over a heat exchanger 10 and pipe line 11 to the $NH_3$-desorber 12. To the desorber, steam is introduced through pipe 40. In addition, the entire aqueous ammonia-containing condensates from the coke oven battery are fed to desorber 12 through line 13. $NH_3$-containing vapors leave the desorber by way of separating bottom 13A and are cooled in a cooler 14, to which cooling water is admitted through line 15 and is withdrawn through line 16. By means of bottom 17, the vapors enter the special part 18 on top of desorber column 12. Both column 12 and column 18 are provided with bell-capped trays (not shown) for increased separating effect.

Reflux vapors are received by top column 18 through line 19, cooler 20, and line 21, and $H_2S$-free $NH_3$ vapors leave 18 through line 22 from where they are passed to a waste heat vessel (not shown).

Partial streams of $NH_3$-vapors are conveyed through pipe lines 23 and 24 to a deacidifier column 25, whereas conversely part of the deacidified ammonia water is led from column 25 through lines 26 and 27 to the desorber column 12.

The ammonia water laden with hydrogen sulfide is withdrawn at the bottom of scrubber 2 by pipe line 28 from which it passes over heat exchanger 29 and line 30 to column 25 in a comparatively warmer state, whereas another part is branched off from line 28 through line 31 and enters the deacidifier column 25 near the top in a cooler state.

$H_2S$-vapors free of $NH_3$ leave column 25 by line 32, whereas ammonia water, free of $H_2S$, leaves column 25 by line 26 and partly returns to $H_2S$-scrubber 2 by line 33, heat exchanger 29, line 34, cooler 35 and line 3.

Waste water free of ammonia and hydrogen sulfide is discharged from the desorber column 12 by line 36, heat exchanger 10 and line 37.

Figure 2:
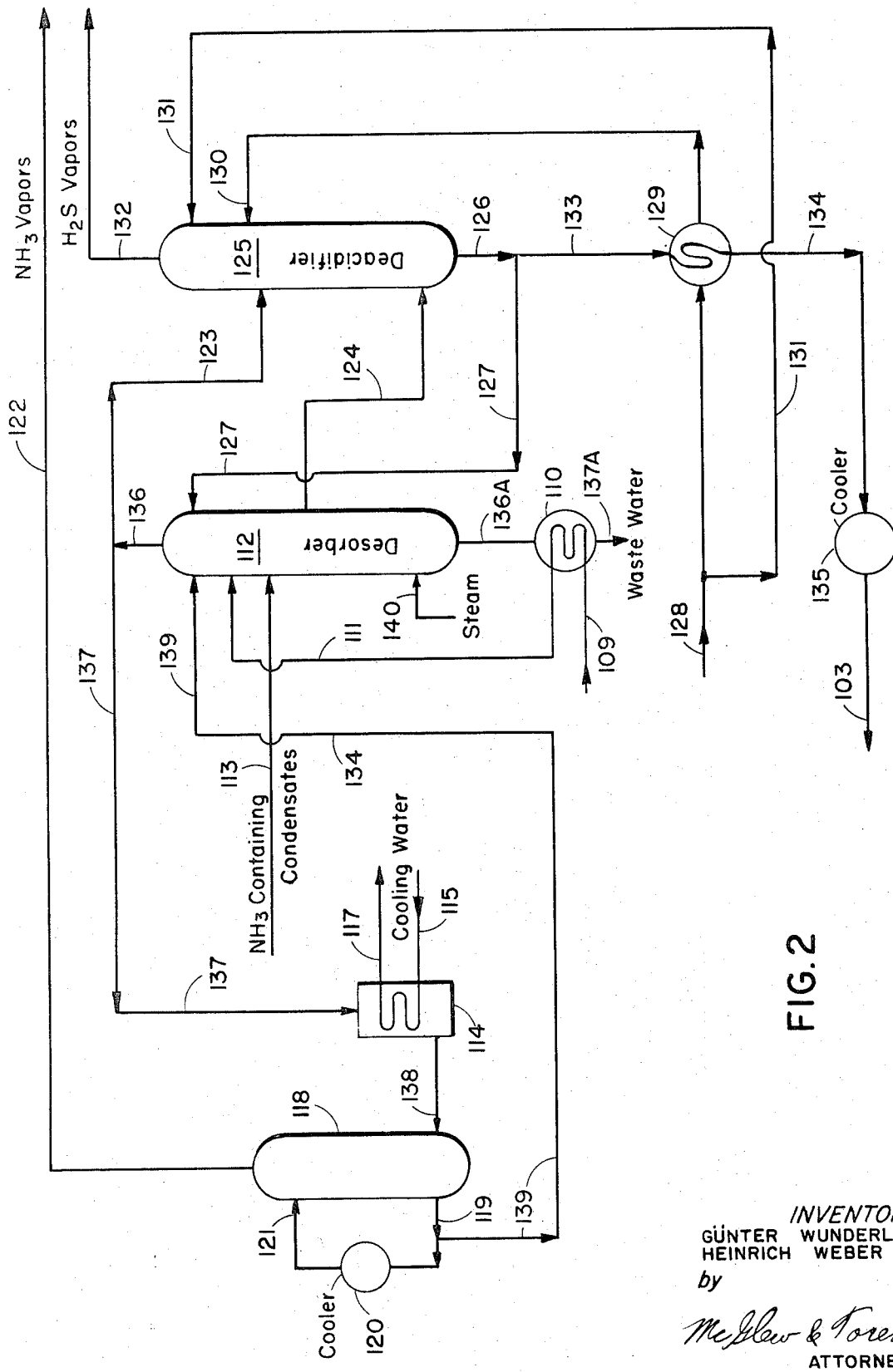
FIG. 2 is a schematic illustration of a further embodiment of an apparatus for separating the gases in which the apparatus for the scrubbing of ammonia and hydrogen sulfide from coke oven gas in a cycle process is provided with a special column for the final separation of the gases; in the Figure, the scrubbing portion, which is identical with that of FIG. 1, has been omitted.

Referring now to FIG. 2, the ammonia-containing scrubbing water leaving scrubber 6 shown in FIG. 1, arrives by pipe line 109 and is passed to $NH_3$-desorber column 112 over heat exchanger 110 and pipe line 111.

As mentioned in the description of column 2 in FIG. 1, column 112 is provided with 16 capped trays (not shown). Ammonia-containing condensates from the coke oven battery are introduced by line 113 and steam through line 140. More ammonia water is fed to column 112 through lines 139 and 127, while, on the other hand, $NH_3$-vapors are passed from there to the deacidifier column 125 by line 124. Ammonia vapors also leave column 112 by line 136 and part thereof is passed to deacidifier column 125 by line 123. Another part is conveyed over line 137, cooler 114—to which cooling water is admitted by line 115 and from which it is withdrawn by line 117—and line 138 to a column 118 which is likewise provided with 9 capped trays.

Reflux is provided in column 118 by line 119, cooler 120 and line 121. Part of the condensate from column 118 is branched off from line 119 and fed back into desorber column 112 by line 139. $NH_3$ vapors free of $H_2S$ escape from the top of column 118 and are led through line 122 to a waste heat vessel (not shown) where they are burned.

Line 128 carries $H_2S$-laden ammonia water, which leaves the $H_2S$ scrubber 2 described in FIG. 1, and passes it partly through heat exchanger 129, and line 130 to the deacidifier column 125 in a warmed-up state; another part is conveyed directly from line 128 over line 131 to the top of column 125 where it arrives in cold state. At the top of column 125, $NH_3$-free vapors of $H_2S$ escape through line 132 and flow to the waste heat vessel for combustion. At the bottom of column 125 $H_2S$-free ammonia water is discharged through line 126 and led back to the $H_2S$-scrubber by line 133, heat exchanger 129, line 134, cooler 135 and line 103.

$NH_3$-free waste water is withdrawn at the bottom of column 112 by line 136A, heat exchanger 110 and line 137A and is passed on to the sewers.

Referring to FIG. 3, a line 222 is shown carrying $NH_3$ vapors in analogy to lines 22 and 122 of FIGS. 1 and 2, respectively. Line 222 leads to a burner 41 of a waste heat vessel 42. A line 43 admits fuel gas, a line 44 admits air to the burner. Soft water is admitted to vessel 42 through line 45, and steam is withdrawn therefrom by line 46. From vessel 42, the burned vapors escape through line 47. Part of the vapors escape through line 48 into the chimney, another part is passed through line 49 to a cooler 50 whose cooling pipes 51 are provided with soft cooling water by pipe line 52. Cooling water leaves the pipes 51 by line 53, condensate is withdrawn at 54. The cooled combustion gases escape from the cooler 50 through line 55.

Line 232 carries $NH_3$-free vapors of $H_2S$ in analogy to lines 32 and 132 of FIGS. 1 and 2, respectively. Line 232 leads to a burner 141 of a waste heat vessel 142, which is fed with air by line 144. Soft water is admitted to the vessel by line 145, steam is withdrawn through 146. The burned gases now containing $SO_2$ escape from vessel 142 through line 147. They are mixed with the cooled gases from the ammonia combustion arriving by line 55. The gas mixture is then either passed on to a plant for production of sulfuric acid operating according to the known principle of wet catalysis, or they are led to a Claus oven for obtaining elementary sulfur.

In the following examples, the invention will be more fully explained by way of illustration, but not of limitation.

EXAMPLE 1

At the bottom of a deacidification column used in the cycle process for washing 75,000 $Nm.^3/h$. ammonia and hydrogen sulfide - containing coke oven gases, 120 $m.^3$ ammonia water practically free from $H_2S$ are hourly discharged with an ammonia content of 14 g./liter (1680 kg. $NH_3/h$.) at a temperature of 95° C. An amount of 35 $m.^3/h$. of ammonia water, i.e., the amount corresponding to 490 kg./h. in the continuous $NH_3$ production of 490 kg./h., are fed into a $NH_3$-desorption column and at the bottom, steam is introduced in such an amount that the waste water obtained will contain less than 0.1 g. free $NH_3$ per liter. At the head of the elongated $NH_3$-desorption column, 3290 kg. damp vapors are hourly escaping which contain practically all the $NH_3$ of 490 kg./h. The ammonia vapors are burned in a waste heat vessel of known construction yielding 3.0 tons per hour of saturated steam at 40 atm. At the head of the deacidification column 550 Nm.³ vapors are obtained per hour with a hydrogen sulfide content of 50 vol. percent which can be worked up to yield 1500 kgs. per hour of 78% sulfuric acid.

In a modified plant, 1200 kgs. of 96% sulfuric acid were hourly obtained from the vapors.

EXAMPLE 2

The procedure follows the one described in Example 1 to the point where 550 Nm.³ vapors per hour are obtained at the head of the deacidification column with a hydrogn sulfide content of 50 vol. percent. However, instead of producing concentrated sulfuric acid, the vapors are fed to a Claus plant (a Claus plant is disclosed in Encyclopedia of Science and Technology, 1960, vol. 13, p. 255, "Sulfur Preparation of the Element;" publ. by McGraw-Hill) where they are converted into elementary sulfur in an amount of 380 kg. per hour.

EXAMPLE 3

The gas specified under I in Table 1 below as to its composition, temperature and pressure, and stemming from an ammonia/hydrogen sulfide circulating washing system for coke oven gas, is introduced to the burner of an ammonia combustion furnace. The dry combustion air specified under II in the Table 1 is introduced to the combustion furnace and combustion of the ammonia takes place. The combustion gas escaping from the ammonia combustion furnace is specified under III in Table 1. The part of the combustion gas specified under IV goes into a waste heat boiler in which the steam VII is produced hourly from water 100° C. hot. The gas specified under V leaves the waste heat boiler and enters an indirect cooler, from which the gas VI discharges overhead. The condensate XVII is drained from the bottom of the indirect cooler. The gas VIII is led around the waste heat boiler and the cooler and combined with the cooled gas VI to form the mixture IX.

The gas specified under X in Table 2, stemming like the ammonia vapors from the ammonia/hydrogen sulfide circulating washing system coke oven gas, is introduced to the burner of a hydrogen sulfide combustion furnace. The combustion air, introduced to the burner is specified under XI. The combustion takes place in the hydrogen sulfide combustionf urnace and the combustion gases escaping from the hydrogen sulfide combustion furnace are specified under XII. The escaping gases flow through a waste heat boiler in which the steam XVIII is produced. The gases escaping from the waste heat boiler are specified under XIII. These gases flow through an indirect cooler from whose bottom the sulfur XIV is removed in liquid state. The gas XV leaves the indirect cooler and is intermixed with the gases IX (Table 1). The combined gases yield the gas XVI (Table 3) which leaves the equipment and is introduced to a Claus installation. With the 191 kg./h. sulfur XIV, a total of 380 kg. sulfur is obtained. A yield of about 95% sulfur is thus obtained.

| | I | II | III | IV | V | VI | VII | VIII | IX | XVII |
|---|---|---|---|---|---|---|---|---|---|---|
| Material, kg./h.: | | | | | | | | | | |
| $NH_3$ | 490 | | | | | | | | | |
| $H_2S$ | 20 | | | | | | | | | |
| $SO_2$ | | | 38 | 33 | 33 | 33 | | | 5 | 38 |
| HCN | 50 | | | | | | | | | |
| $CO_2$ | 20 | | 101 | 86 | 86 | 86 | | 15 | 101 | |
| $N_2$ | | 2,590 | 2,925 | 2,509 | 2,509 | 2,509 | | 416 | 2,925 | |
| $O_2$ | | 759 | 5 | 4 | 4 | 4 | | 1 | 5 | |
| $H_2O$ gas humidity | 430 | | 1,290 | 1,105 | 1,105 | 1,105 | | 185 | 382 | |
| Water condensate | | | | | | | | | | |
| Steam generated | | | | | | | 2,800 | | | |
| Air | | 3,349 | | | | | | | | |
| (Total) | 1,010 | 3,349 | 3,737 | 3,737 | 3,737 | 3,737 | 2,800 | 622 | 3,451 | 908 |
| Temperature, °C | 80 | 10 | 1,200 | 300 | 40 | 40 | | 1,200 | 260 | 40 |
| Pressure, atm. abs | 1.15 | 1.0 | 1.0 | 1.0 | 1.0 | 1.0 | 41 | 1.0 | 1.0 | |

TABLE 2

| | X | XI | XII | XIII | XIV | XV | XVIII |
|---|---|---|---|---|---|---|---|
| Material, kg./h.: | | | | | | | |
| $NH_3$ | Trace | | | | | | |
| $H_2S$ | 405 | | 148 | 148 | | 148 | |
| $SO_2$ | | | 102 | 102 | | 102 | |
| HCN | Trace | | | | | | |
| $CO_2$ | 480 | | 480 | 480 | | 480 | |
| $N_2$ | 576 | | 566 | 566 | | 566 | |
| $O_2$ | 170 | | | | | | |
| $H_2O$ gas humidity | 25 | | 169 | 169 | | 169 | |
| Water condensate | | | | | | | |
| Steam generated | | | | | | | 610 |
| Elementary sulfur | | | 191 | 191 | 191 | | |
| Air | | 746 | | | | | |
| (Total) | 910 | 746 | 1,656 | 1,656 | 191 | 1,465 | 610 |
| Temperature, °C | 30 | 10 | 970 | 300 | 130 | 130 | |
| Pressure, atm. abs | 1.15 | 1.0 | 1.0 | 1.0 | | 1.0 | 40 |

TABLE 3

| | IX | XV | XVI | XVII | XII+XVIII | XIV |
|---|---|---|---|---|---|---|
| Material, kg./h.: | | | | | | |
| $H_2S$ | | 148 | 148 | | | |
| $SO_2$ | 38 | 102 | 140 | | | |
| $CO_2$ | 101 | 480 | 581 | | | |
| $N_2$ | 2,925 | 566 | 3,491 | | | |
| $O_2$ | 5 | | 5 | | | |
| $H_2O$ gas humidity | 382 | 169 | 551 | | | |
| Water condensate | | | | 908 | | |
| Steam generated | | | | | 3,410 | |
| Elementary sulfur | | | | | | 191 |
| (Total) | 3,451 | 1,465 | 4,916 | 908 | 3,410 | 191 |
| Temperature, °C | 260 | 130 | 230 | 40 | | 130 |
| Pressure, atm. abs | 1.0 | 1.0 | 1.0 | | 41 | |

EXAMPLE 4

The ammonia-containing gas I (Table 1) which stems from an ammonia/hydrogen sulfide circulating washing system for coke oven gas is introduced to the burner of an ammonia combustion furnace. The air II is introduced to the furnace and ammonia is burned in the combustion furnace. The combustion gases III are discharged from the combustion furnace and enter waste heat boiler in which the steam VIII is generated. The gas IV is discharged from the waste heat boiler and enters an indirect cooler from whose sump the condensate V is drained. The gas VI escapes overhead from the cooler.

The burner of a hydrogen sulfide combustion furnace receives the gas X (Table 2) from the ammonia/hydrogen sulphide circulating washing sys tem. The combustion air XI is introduced to the burner and the hydrogen sulfide vapors are burned; the combustion gases XII escape from the combustion furnace and enter a waste heat boiler in which the steam XIV is generated from hot water at 100° C. Escaping from the waste heat boiler, the gas XIII is combined with the gas VI (Table 1). The resulting mixed gas XV (Table 3) escapes from the installation and has the proper temperature for entry into the wet catalysis equipment, in which 1500 kg. of 78% sulfuric acid are produced. The yield of sulfur conversion to sulfuric acid is better than 99%.

TABLE 1

| | I | II | III | IV | V | VI | VII |
|---|---|---|---|---|---|---|---|
| Material, kg./h.: | | | | | | | |
| $NH_3$ | 490 | | | | | | |
| $H_2S$ | 20 | | | | | | |
| $SO_2$ | | | 38 | 38 | | 38 | |
| HCN | 50 | | | | | | |
| $CO_2$ | 20 | | 101 | 101 | | 101 | |
| $N_2$ | | 3,920 | 4,250 | 4,250 | | 4,250 | |
| $O_2$ | | 1,149 | 400 | 400 | | 400 | |
| $H_2O$ gas humidity | 430 | | 1,290 | 1,290 | | 235 | |
| Water condensate | | | | | 1,055 | | |
| Steam generated | | | | | | | 2,800 |
| Air | | 5,069 | | | | | |
| (Total) | 1,010 | 5,069 | 6,079 | 6,079 | 1,055 | 5,024 | 2,800 |
| Temperature, °C | 80 | 10 | 1,200 | 300 | 40 | 40 | |
| Pressure, atm. abs | 1.15 | 1.0 | 1.0 | 1.0 | | 1.0 | 41 |

TABLE 2

| | X | XI | XII | XIII | XIV |
|---|---|---|---|---|---|
| Material, kg./h.: | | | | | |
| $NH_3$ | Trace | | | | |
| $H_2S$ | 405 | | | | |
| $SO_2$ | | | 703 | 763 | |
| HCN | Trace | | | | |
| $CO_2$ | 480 | | 480 | 480 | |
| $N_2$ | | 2,530 | 2,530 | 2,530 | |
| $O_2$ | | 823 | 212 | 212 | |
| $H_2O$ gas humidity | 25 | | 278 | 278 | |
| Water condensate | | | | | |
| Steam generated | | | | | 770 |
| Air | | 3,353 | | | |
| (Total) | 910 | 3,353 | 4,263 | 4,263 | 770 |
| Temperature, °C | 20 | 20 | 1,170 | 825 | |
| Pressure, atm. abs | 1.15 | 1.0 | 1.0 | 1.0 | 41 |

TABLE 3

| Material, kg./h.; | VI | XIII | XV | VII+XIV | V |
|---|---|---|---|---|---|
| $SO_2$ | 38 | 763 | 801 | | |
| $CO_2$ | 101 | 480 | 581 | | |
| $N_2$ | 4,250 | 2,530 | 6,780 | | |
| $O_2$ | 400 | 212 | 612 | | |
| $H_2O$ gas humidity | 235 | 278 | 513 | | |
| Water condensate | | | | | 1,055 |

The above Examples have been given by way of illustration, but many modifications in the details may be made without departing of the spirit of the invention.

What is claimed is:

1. In the process for the manufacture of sulfur or sulfuric acid from hydrogen sulfide contained in coke oven gas by combustion to sulfur dioxide and processing to sulfur according to the Claus method, or to sulfuric acid according to the wet catalysis method under simultaneous combustion of coke oven ammonia, the ammonia and the hydrogen sulfide being washed out of the coke oven gas in an ammonia/hydrogen sulfide circulating washing system and the ammonia being concentrated in the vapors from a deacidifier, the improvement which comprises:

(a) separating the vapors from the said deacidifier into a first stream predominantly ammonia, and into a second stream predominantly hydrogen sulfide;

(b) subjecting the first ammonia stream and the second hydrogen sulfide stream separately to combustion, and utilizing the combustion heat and cooling the combustion gases from the combustion of said first ammonia stream and said second hydrogen sulfide stream;

(c) separating aqueous condensate from the gas stream resulting from combustion of the first ammonia stream; and (d) adding the remaining gases, at least in part, to the combustion gases of the hydrogen-sulfide concentration stream for adjustment of the temperature and concentration of the gases before being further processed for recovery of elementary sulfur or sulfuric acid.

2. Process according to claim 1, wherein the deacidifier vapors containing ammonia are separated in the deacidifier column itself into an ammonia vapor fraction and a hydrogen sulfide vapor fraction.

3. Process according to claim 1, wherein the deacidifier vapors containing ammonia are separated into an ammonia vapor fraction and a hydrogen sulfide vapor fraction in a separating column succeeding the deacidifier column.

4. Process according to claim 1, wherein each of the said streams is mixed, before burning, with ignition of fuel gases for promoting combustion thereof.

5. Process according to claim 1, wherein the gases resulting from the combustion of the stream consisting of ammonia-containing vapors are cooled, the condensate obtained by cooling is withdrawn, and the remaining gases are added at least in part, to the combustion gases of the hydrogen-sulfide-containing stream for adjustment of the temperature and concentration of the gases before being further processed for the recovery of elementary sulfur or sulfuric acid.

References Cited

UNITED STATES PATENTS

| | | | |
|---|---|---|---|
| 3,505,027 | 4/1970 | Breitbach et al. | 423—351 |
| 3,335,071 | 8/1967 | Bollen et al. | 55—70 |
| 3,540,189 | 11/1970 | Siewers et al. | 423—238 |
| 3,518,056 | 6/1970 | Klett | 423—574 |
| 3,292,345 | 12/1966 | Wunderlich et al. | 55—73 |

FOREIGN PATENTS

| | | |
|---|---|---|
| 1,055,572 | 1/1967 | Great Britain. |
| 1,140,339 | 1/1969 | Great Britain. |

OSCAR R. VERTIZ, Primary Examiner

B. E. HEARN, Assistant Examiner

U.S. Cl. X.R.

423—224, 234, 238, 573, 574